United States Patent [19]

Crew et al.

[11] 4,223,175
[45] Sep. 16, 1980

[54] CABLE SUPPORT SYSTEMS

[75] Inventors: Eric W. Crew, Broxbourne; Peter Harvey, London; Andrew R. Fry, Barnet, all of England

[73] Assignee: BICC Limited, London, England

[21] Appl. No.: 960,866

[22] Filed: Nov. 15, 1978

[30] Foreign Application Priority Data

Nov. 17, 1977 [GB] United Kingdom ............... 47986/77
Oct. 18, 1978 [GB] United Kingdom ............... 40946/78

[51] Int. Cl.² ............................................. H01B 7/34
[52] U.S. Cl. .................................... 174/15 R; 169/48; 174/48
[58] Field of Search ................... 174/15 R, 15 C, 48, 174/49; 169/48, 49

[56] References Cited

U.S. PATENT DOCUMENTS

| 3,684,816 | 8/1972 | Reighter | 174/15 C |
| 3,798,346 | 3/1974 | Kreuzer | 174/15 C |
| 3,955,042 | 5/1976 | Kellow et al. | 174/15 C |
| 4,097,682 | 6/1978 | Perry et al. | 174/15 C X |
| 4,135,055 | 1/1979 | Beckers et al. | 169/48 X |

FOREIGN PATENT DOCUMENTS

| 2360758 | 6/1975 | Fed. Rep. of Germany | 174/15 C |
| 2536565 | 2/1977 | Fed. Rep. of Germany | 169/48 |
| 1145798 | 10/1957 | France | 169/48 |

Primary Examiner—Arthur T. Grimley
Attorney, Agent, or Firm—Buell, Blenko & Ziesenheim

[57] ABSTRACT

An electric cable support system is provided having means for supporting electric cables and an elongate metal duct housing said support means and divided transversely into separately formed parts that are detachably secured together, the internal surface of at least a part of the length of the elongate duct is lined with a continuous wall of thermal insulating material and/or absorbing material comprising a closed envelope, or at least two closed envelopes arranged adjacent one another, containing non-flammable evaporative cooling fluid. Preferably, the or each envelope is made of a flexible material which will melt at a temperature at or near the boiling point of the cooling fluid. In the event of an external fire, when the temperature of the duct wall is sufficient to melt the flexible material of an envelope, the cooling fluid will start to evaporate and cool the duct interior.

28 Claims, 8 Drawing Figures

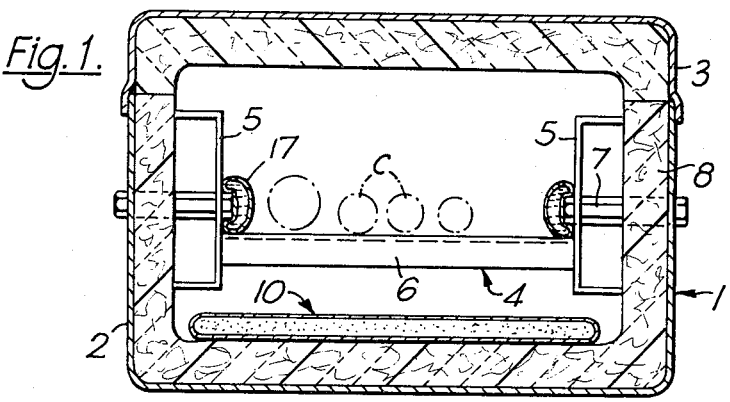
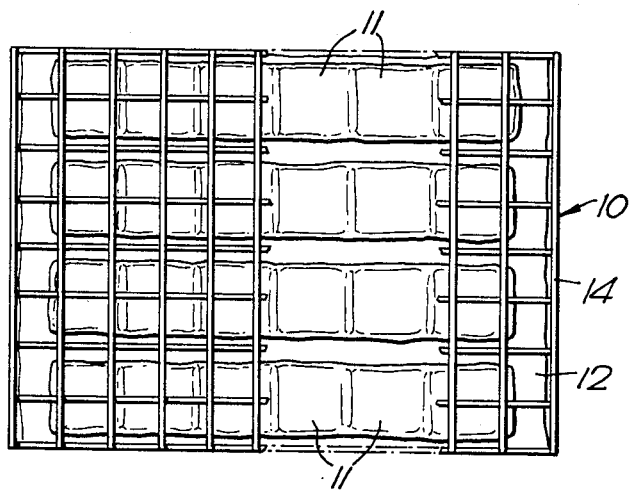
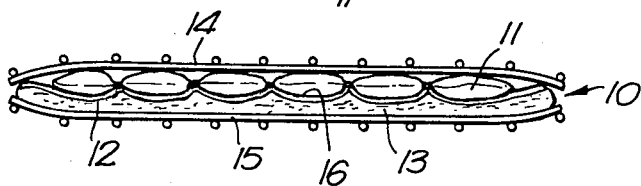
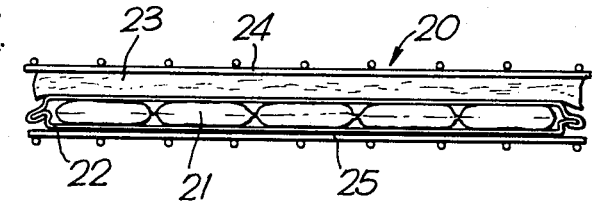

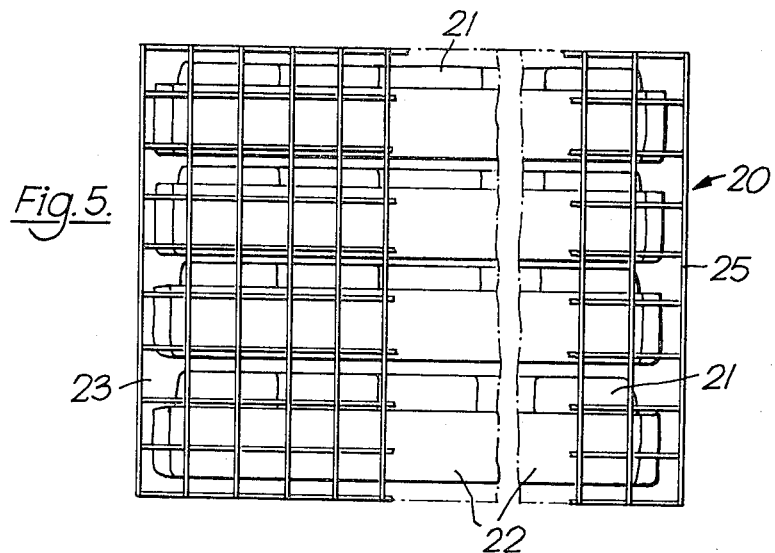
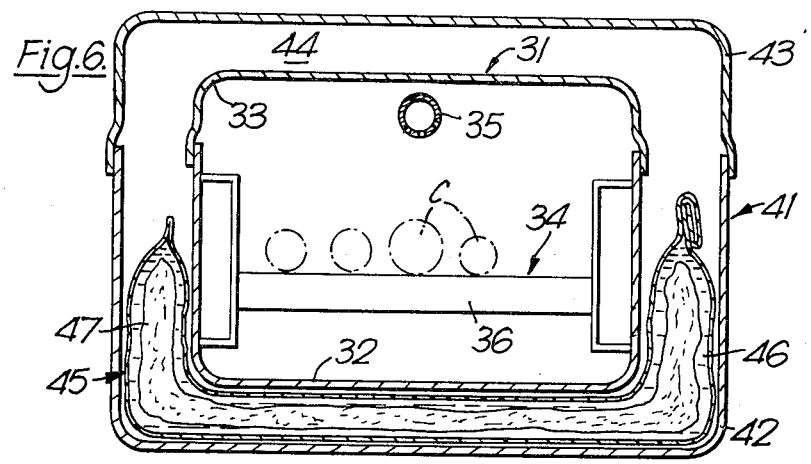
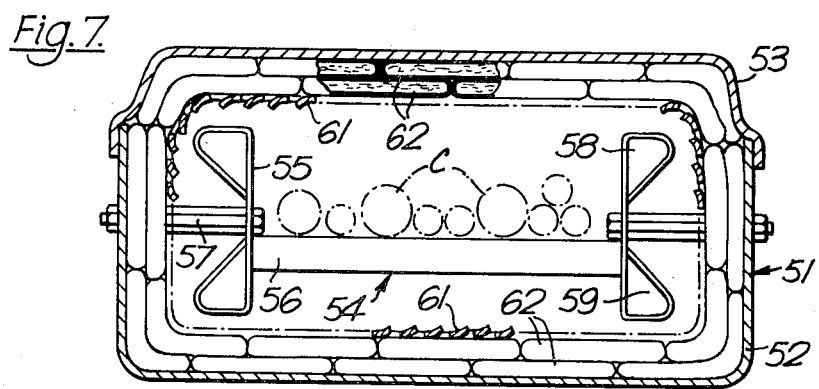

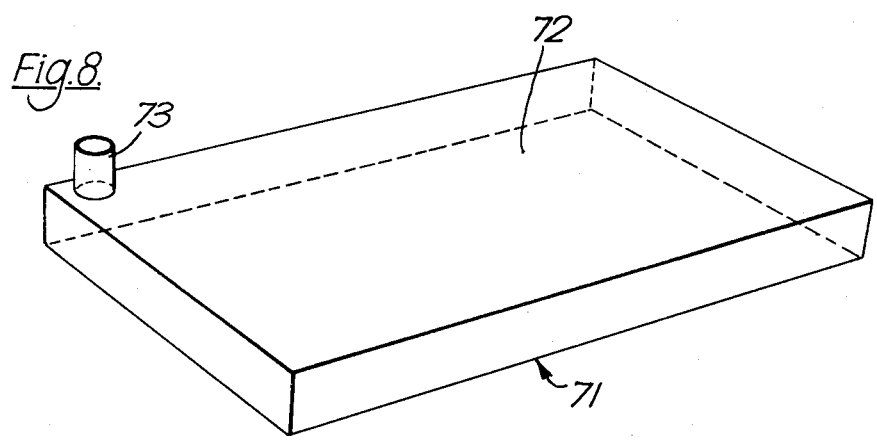

CABLE SUPPORT SYSTEMS

This invention relates to electric cable and/or service pipe supports in which protection is provided against the effects of external fires.

According to the invention, an improved electric cable and/or service pipe support comprises means for supporting one or more than one electric cable and/or service pipe; an elongate metal duct housing said support means and divided transversely of its length into separately formed parts that are detachably secured together; and, lining the internal surface of at least a part of the length of the elongate duct, a continuous wall of thermally insulating material and/or thermally absorbing material comprising a closed envelope or at least two closed envelopes arranged side by side and/or end to end, containing non-flammable evaporative cooling fluid.

The continuous wall of thermally insulating material and/or thermally absorbing material constituted by the closed envelope or envelopes containing non-flammable evaporative cooling fluid may line a portion or the whole of the internal surface of said part of the length of the elongate duct.

The closed envelope or each of at least some of the closed envelopes is preferably made of a flexible fluid-impermeable material, e.g. a plastics material, which will melt at a temperature at or near the boiling point of the cooling fluid, the arrangement being such that in the event of an external fire, when the temperature of the wall of the duct is sufficent to melt the plastics or other flexible material of an envelope, the cooling fluid will start to evaporate rapidly. This evaporation reduces the rate of penetration of heat into the interior of the duct for a time sufficient for the fire to be extinguished or brought under control before any permanent damage to electric cables and/or service pipes housed in the duct can take place.

The or each closed flexible envelope may be sealed at each of a plurality of positions along its length to form a plurality of separate flexible sachets containing evaporative cooling fluid.

The or each flexible envelope or sachet may be carried by fluid-impermeable supporting means of such a shape that, in the event of rupture of an envelope or sachet, cooling fluid that has not yet evaporated will collect in said supporting means, thereby substantially reducing the risk of loss of cooling fluid by migration due to capillary action and gravitational force.

Where the internal surface of a part of the duct to be lined lies in a substantially horizontal plane, a layer of fluid-impermeable sheet material may underlie the envelopes or sachets and may be so shaped adjacent each envelope or sachet as to form a depression for collection of any cooling fluid that has not evaporated. The layer of fluid-impermeable sheet material may be preformed with discrete depressions of a shape and size appropriate to the envelopes or sachets it is to underlie or the layer of fluid-impermeable sheet material may be flexible, e.g. a sheet of metal foil, and depressions of appropriate shape and size formed in the sheet when the sachets are assembled therewith.

Where the internal surface of a part of the duct lies in a plane that is substantially vertical or is inclined at an angle to the horizontal, each envelope or sachet may be supported in a fluid-impermeable carrier which has at or near its lower end a pocket for collection of cooling fluid that has not yet evaporated and which may or may not be preformed. In one embodiment, each envelope or sachet may be at least partially wrapped in metal foil or other thermally resistant fluid-impermeable material to form a carrier with a pocket at its lower end.

Instead of making the closed envelope or each of at least some of the closed envelopes or sachets of a flexible material which melts when the wall of the duct reaches a predetermined temperature to permit evaporation of the cooling fluid, the closed envelope or each of at least some of the closed envelopes or sachets may be a container which is made of a material that will not melt at a temperature at or near the boiling point of the cooling fluid but which has in a wall of the container at least one relief device of such a form as to permit escape of evaporated cooling fluid and thereby prevent the risk of excessive pressure in the container as the temperature of the wall of the duct rises.

The or each relief device may take any convenient form. Suitable relief devices include a plug which is a press fit in an aperture in the container and which will be ejected as the pressure in the container rises, a plug closing an aperture in the container and made of fusible metal or of thermoplastics material which will melt at a temperature at or near the boiling point of the cooling fluid, and a diaphragm which closes an aperture in the container and which is designed to rupture as the pressure in the container rises.

The container or each of at least some of the containers may be separately formed with respect to the duct and to the metal support means in the duct or it may be formed at least in part by the wall of the duct and/or a wall of the support means, the or each relief device being so positioned that evaporated cooling fluid will be ejected into the duct.

In all cases, where there is more than one envelope, sachet or other container lining the internal surface of at least a part of the duct, the envelopes, sachets or other containers may be separately formed with respect to one another or they may be integral with or connected to one another.

In all cases, also, the or each envelope, sachet or other container may be preformed to any desired shape complementary to the part of the internal surface of the duct which it lines.

Although it is preferred that the or each envelope, sachet or other container contains evaporative cooling liquid only, in some circumstances at least one of the envelopes, sachets or other containers may contain a thermally insulating and/or absorbing material that is saturated with an evaporative cooling liquid.

Where the or each envelope, sachet or other container is separately formed with respect to the duct, with a view to reducing the rate of rise of temperature of the envelope, sachet or other container in the event of an external fire, preferably at least one layer of thermally insulating material is interposed between the or each envelope, sachet or other container and the internal surface of the duct which it lines. Preferably, the thermally insulating material of this layer is flexible and will absorb moisture. We prefer to employ for this layer, thermally insulating material of a fibrous nature.

In some cases, it is preferred to line the internal surface of a part or parts or the whole of the length of the duct with a preformed assembly comprising one or more than one envelope, sachet or other container and a layer of fibrous thermally insulating material on the side of the container or containers nearer the internal surface of the duct, said container or containers and the layer of fibrous thermally insulating material being clamped together between two substantially rigid sheets of fluid-impermeable material, at least the sheet remote from the layer of thermally insulating material being perforated. One or each perforated substantially rigid sheet may be a sheet of wire mesh or expanded metal. Use of a preformed assembly or performed assemblies of this kind has the advantage that, after an external fire, a preformed assembly can be readily replaced if required. Where one or more than one preformed assembly of this kind is employed, preferably a separate layer of thermally insulating material is positioned between the or each preformed assembly and the internal surface of the part of the duct which it lines. In this case, the or each separate layer of thermally insulating material may be of a higher grade, and therefore more expensive, than the thermally insulating material forming a component part of an assembly as it is unlikely to need to be replaced. By this arrangement, the temperature gradient between the outside of the duct and the support means housed in the duct can be accurately predetermined and the rate of heating of the envelopes, sachets or other containers in the event of an external fire closely controlled.

In all cases, for lining the internal surface of a part or parts of the wall of the duct, it is an advantage to employ a multiplicity of small sachets or other containers, either separate from one another or in integral or interconnected groups, rather than a lesser number of larger sachets or other containers, since any failure or damage to a few of the small sachets would have a proportionally small effect on the fire protection characteristics of the support. Also, small sachets of flexible material can more readily be made to have sufficient strength to resist pressure and rough handling than is the case with larger sachets.

The or each envelope, sachet or other container, or the or each preformed assembly of sachets or other containers as hereinbefore described, may be held against the internal surface of the duct by any convenient means. In some cases, it is preferred to employ a tubular support constituting, in effect, an inner duct which houses the support means and which may or may not be perforated, e.g. a tubular support of expanded metal.

Where, as is preferred, the support means for electric cables and/or service pipes is or are of metal or metal alloy, e.g. an elongate metal tray or ladder, the continuous wall of thermally insulating and/or absorbing material may be in direct thermal contact with the support means.

It will be appreciated that the or each envelope, sachet or other container, or a preformed assembly or preformed assemblies of sachets or other containers as hereinbefore described, can be arranged to line the internal surface of any part of the duct alone or in combination with a layer of thermally insulating material at any required location or locations along the duct where there is risk of an external fire.

Sachets and/or other containers of cooling fluid can also be employed at positions along the duct where excessive local heating is likely during an external fire, such as the internal ends of metal fixing bolts or brackets of the support whose other ends are outside the duct and would be exposed to an external fire. Such sachets and/or other containers would absorb heat and reduce the rate of rise of temperature arising from conduction of heat along the metal fixing bolts or brackets into the interior of the duct.

Where the support means is an elongate metal tray or ladder or other metal support means, preferably at least one elongate chamber for passage of cooling fluid is in thermal contact with the metal support means so that heat emitted by electric cables and/or service pipes carried by the metal support means is extracted by cooling fluid flowing along the or each elongate chamber. The or each elongate chamber may be separately formed with respect to the metal support means and may be mechanically secured to or carried by the metal support means but, preferably, where the metal support means is in the form of an elongate tray, one or each side wall of the tray may be so shaped as to define an elongate chamber for passage of cooling fluid. For example, where the elongate tray is of a ladder-like form in which the spaced rungs of the ladder support electric cables and/or service pipes, the side members of the ladder may each be so shaped as to define an elongate chamber.

The or each elongate chamber may constitute a part of a closed circulatory system around which cooling fluid can be caused to flow and in which may be interconnected at least one heat exchanger for extracting heat from the circulating fluid.

Where desired, the space between electric cables and/or service pipes housed in the duct and the continuous wall of thermally insulating material and/or thermally absorbing material may be substantially filled with a material of high thermal conductivity for carrying away from the cables and/or service pipes heat emitted during normal service.

The invention will be further illustrated by a description, by way of example, of a preferred electrical cable and/or service pipe support and of several alternative forms of electric cable and/or service pipe support and components thereof with reference to the accompanying drawings, in which:

FIG. 1 is a diagrammatic transverse cross-sectional view of the preferred electric cable and/or service pipe support;

FIGS. 2 and 3, respectively, are plan and side views of a preformed assembly of sachets used in the support shown in FIG. 1;

FIGS. 4 and 5, respectively, are plan and side views of a preformed assembly of sachets for use in an electric cable and/or service pipe support which extends vertically or at an angle to the horizontal;

FIGS. 6 and 7 are diagrammatic transverse cross-sectional views of two alternative forms of electric cable and/or service pipe support, and FIG. 8 is an isometric view of a substantially rigid container with relief device for lining the internal surface of a part of an electric cable and/or service pipe support.

The electric cable and/or service pipe support shown in FIGS. 1 to 3 comprises a metal duct 1 consisting of a trough 2 and a cover 3. Mounted in and extending along the duct 1 is a ladder-like metal support 4 consisting of a pair of elongate side members 5 and a plurality of mutually spaced rungs 6 on which cables C can be supported. The cable ladder 4 is secured in the duct 1 by metal bolts 7 at spaced positions along its length. The trough 2 and cover 3 of the duct 1 are each lined with a layer 8 of fibrous thermally insulating material of high quality.

Overlying the layer 8 of fibrous thermally insulating material at the bottom of the trough 2 along the length of the duct are a plurality of preformed assemblies 10 arranged end to end. As will be seen on referring to FIGS. 2 and 3, each preformed assembly 10 comprises four strips of integrally connected flexible plastics sachets 11, each containing water. The strips of sachets 11 overlie a flexible sheet 12 of fluid-impermeable material, e.g. metal foil, and a layer 13 of fibrous thermally insulating material of lower quality than that of the layer 8. The strips of sachets 11, the flexible sheet 12 and the thermally insulating layer 13 are clamped between two substantially rigid sheets 14, 15 of wire mesh by mutually spaced clips (not shown). When the component parts of the preformed assembly 10 are clamped together, the sachets 11 form, in the flexible sheet 12, depressions 16 which underlie the sachets.

Flexible plastics sachets 17 containing water are also secured over the internal ends of the fixing bolts 7 and over the immediately adjacent parts of the side members 5.

In the event of an external fire, when the temperature of the bottom wall of the duct 1 reaches a temperature sufficient to melt the plastics material of the sachets, some or all of the sachets will melt and the water in these sachets will start to evaporate, any water that has not yet evaporated being collected in the depressions 16. Evaporation of the water reduces the rate of penetration of heat into the interior of the duct 1 for a time sufficient for the fire to be extinguished or brought under control before any permanent damage to cables C can take place.

Where a wall of a duct of an electric cable and/or service pipe support whose internal surface is to be lined with a preformed assembly of flexible sachets lies in a substantially vertical plane or at an angle to the horizontal, the preformed assembly 20 shown in FIGS. 4 and 5 can be employed. The preformed assembly 20 comprises four strips of integrally connected flexible plastics sachets 21 each containing water. The strips of sachets 21 are arranged one above the other and each strip is carried in a pocket 22 of flexible fluid-impermeable material, e.g. metal foil. A layer 23 of fibrous thermally insulating material is arranged on one side of the four strips of sachets 21 and the strips of sachets, their associated pockets 22 and the thermally insulating layer 23 are clamped between substantially rigid sheets 24, 25 of wire mesh by clips (not shown). The pockets 22 serve to collect any unevaporated water when sachets 21 melt in the event of an external fire.

In the first of the alternative forms of electric cable and/or service pipe support shown in FIG. 6, an internal metal duct 31 consisting of a trough 32 and cover 33 has mounted in and extending along the duct a metal ladder-like support 34 on the rungs 36 of which cables C are supported. The internal duct is housed in an external metal duct 41 consisting of a trough 42 and cover 43 in such a way that a space 44 is formed between the two ducts. Positioned in and extending along the lower part of the space 44 is a flexible plastics envelope 45 which is transversely sealed at spaced positions along its length to form a plurality of sachets 46. Each sachet 46 contains a thermally insulating material 47 which is saturated with water. Housed within the internal duct 31 is a perforated pipe 35 by means of which cooling water can be sprayed directly on to the cables C. Although only one layer of sachets 46 is shown, it will be appreciated that the lower part of the space 44 may contain two or more layers of separate sachets.

In the event of an external fire, when the temperature of the wall of the external duct 31 is sufficient to melt the plastics material of some or all the sachets 46, cooling water from the saturated thermally insulating material 47 evaporates to reduce the rate of penetration of heat into the interior of the duct. Cooling water can be sprayed directly on to the cables C by automatic or manual control as and when required.

The electric cable and/or service pipe support shown in FIG. 7 comprises a metal duct 51 consisting of a trough 52 and cover 53 and, mounted in and extending along the duct, a metal ladder-like support 54 on the rungs 56 of which cables C are supported. Each of the side members 55 of the cable ladder 54 is so shaped as to form elongate compartments 58,59 for circulatory flow of cooling liquid. The cable ladder 54 is secured to the duct 51 by metal bolts 57. Surrounding the cable ladder 54 and spaced from the internal surface of the duct 51 is a substantially rigid sleeve 61 of expanded metal, the space between the sleeve and the duct being substantially filled with separately formed flexible plastics envelopes 62 containing water or thermally insulating material saturated with water. In the event of an external fire, the envelopes 62 containing water melt and the water evaporates as previously described.

As has previously been explained, in some circumstances substantially rigid containers of a material that will not melt at a temperature at or near the boiling point of water may be employed instead of, or in addition to, flexible envelopes and sachets. One such container is shown in FIG. 8. The container comprises a separately formed metal box 71 of substantially rectangular form having in one of its major faces 72 a relief device 73 which may take any of the forms of relief device hereinbefore described. The box 71 may be arranged to lie on the bottom wall of a duct with its major face 72 uppermost or it may be arranged to line the internal surface of a side wall of a duct with its major face 72 innermost. In the event of an external fire, when the temperature of the duct wall is sufficient to cause evaporation of the water contained in the box 71, evaporated water is released from the relief device 73 into the interior of the duct, the evaporation reducing the rate of penetration of heat into the interior of the wall duct for a time sufficient for the fire to be extinguished or brought under control before any permanent damage to cables and/or service pipes housed in the duct can take place.

What we claim as our invention is:

1. A support system for electric cables comprising means for supporting at least one electric cable; an elongate metal duct housing said support means and divided transversely of its length into separately formed parts that are detachably secured together; and lining the internal surface of at least a part of the length of the elongate duct, a continuous wall comprising at least one closed envelope containing non-flammable evaporative cooling fluid.

2. A support system for electric cables comprising means for supporting at least one electric cable; an elongate metal duct housing said support means and divided transversely of its length into separately formed parts that are detachably secured together; and, lining the internal surface of at least a part of the length of the elongate duct, a continuous wall comprising at least one closed flexible envelope containing non-flammable evaporative cooling fluid, the closed envelope or each of at least some of the closed envelopes being made of a material which will melt at a temperature approximating to the boiling point of the cooling fluid, the arrangement being such that, in the event of an external fire, when the temperature of the wall of the duct is sufficient to melt the flexible material of an envelope, the cooling fluid will start to evaporate.

3. An electric cable support system as claimed in claim 2, wherein the continuous wall comprises a plurality of separately formed, closed flexible envelopes containing non-flammable evaporative cooling fluid, arranged adjacent to one another.

4. An electric cable support system as claimed in claim 2, wherein the or each closed flexible envelope is sealed at each of a plurality of positions along its length to form a plurality of separate flexible sachets containing evaporative cooling fluid.

5. A support system for electric cables comprising means for supporting at least one electric cable; an elongate metal duct housing said support means and divided transversely of its length into separately formed parts that are detachably secured together; and, lining the internal surface of at least a part of the length of the elongate duct, a continuous wall in the form of a preformed assembly comprising a plurality of closed flexible sachets arranged adjacent one another and each containing non-flammable evaporative cooling fluid, and a layer of fibrous thermally insulating material on the side of the sachets nearer the internal surface of the duct, the sachets and the layer of fibrous thermally insulating material being clamped between two substantially rigid sheets of fluid-impermeable material, at least the sheet remote from the layer of fibrous thermally insulating material being perforated.

6. An electric cable support system as claimed in claim 5, wherein one or each perforated substantially rigid sheet of the preformed assembly is a sheet of wire mesh.

7. An electric cable support system as claimed in claim 5, wherein a separate layer of thermally insulating material is positioned between the or each preformed assembly and the internal surface of the part of the duct which it lines.

8. An electric cable support system as claimed in claim 7, wherein the or each separate layer of thermally insulating material is of a higher grade than the thermally insulating material forming a component part of the assembly.

9. An electric cable support system as claimed in claim 5, wherein each closed flexible sachet is of plastics material.

10. An electric cable support system as claimed in claim 5, wherein each flexible sachet is carried by fluid-impermeable supporting means of such a shape that, in the event of rupture of a sachet, cooling fluid that is not evaporated will collect in said supporting means.

11. An electric cable support system as claimed in claim 10, in which the lined internal surface of the duct lies in a substantially horizontal plane, wherein the fluid-impermeable supporting means is a layer of fluid-impermeable sheet material which underlies the sachets and is so shaped adjacent each sachet as to form a depression for collection of any cooling fluid that has not evaporated.

12. An electric cable support system as claimed in claim 10, in which the lined internal surface of the duct lies in a plane that is at an angle to the horizontal, wherein each sachet is supported in a fluid-impermeable carrier which has at its lower end a pocket for collection of cooling fluid that has not evaporated.

13. A support system for electric cables comprising means for supporting at least one electric cable; an elongate metal duct housing said support means and divided transversely of its length into separately formed parts that are detachably secured together; and, lining the internal surface of at least a part of the length of the elongate duct, a continuous wall comprising at least one closed envelope containing non-flammable evaporative cooling fluid, the closed envelope or each of at least some of the closed envelopes being in the form of a container made of a material that will not melt at a temperature approximating to the boiling point of the cooling fluid and having in a wall of the container at least one relief device of such a form as to permit escape of evaporated cooling fluid.

14. An electric cable support system as claimed in claim 13, wherein the relief device is a plug which is a press fit in an aperture in the container and which will be ejected as the pressure in the container rises.

15. An electric cable support system as claimed in claim 13, wherein the relief device is a plug closing an aperture in the container and made of a material which will melt at a temperature approximating to the boiling point of the cooling fluid.

16. An electric cable support system as claimed in claim 13, wherein the relief device is a diaphragm which closes an aperture in the container and which is designed to rupture as the pressure in the container rises.

17. An electric cable support system as claimed in claim 13, wherein the container or each of at least some of the containers is formed at least in part by the wall of the duct, the or each relief device being so positioned that evaporated cooling fluid will be ejected into the duct.

18. An electric cable support system as claimed in claim 1, wherein at least one layer of thermally insulating material is interposed between the or each envelope and the internal surface of the duct which it lines.

19. An electric cable support system as claimed in claim 18, wherein the or each interposed layer of thermally insulating material is flexible and will absorb moisture.

20. An electric cable support system as claimed in claim 18, wherein the or each interposed layer of thermally insulating material is of a fibrous nature.

21. An electric cable support system as claimed in claim 1, wherein the or each envelope is preformed to a shape complementary to that of the part of the internal surface of the duct which it lines.

22. An electric cable support system as claimed in claim 1, wherein the envelope, or at least one of the envelopes, contains a thermally insulating material that is saturated with an evaporative cooling fluid.

23. An electric cable support system as claimed in claim 1, wherein the or each envelope is held against the internal surface of the duct by a tubular support constituting, in effect, an inner duct housing the support means.

24. An electric cable support system as claimed in claim 1, in which the support means is of metal or metal alloy, wherein said continuous wall is in direct contact with the support means.

25. An electric cable support system as claimed in claim 1, in which the support means is an elongate metal tray, wherein at least one elongate chamber for passage of cooling fluid is in thermal contact with the elongate metal tray so that heat emitted by electric cables carried by the metal tray can be extracted by cooling fluid flowing along the or each elongate chamber.

26. An electric cable support system as claimed in claim 25, wherein the or each elongate chamber is defined at least in part by a side wall of the elongate metal tray constituting the support means.

27. An electric cable support system as claimed in claim 25, wherein the or each elongate chamber constitutes a part of a closed circulatory system around which cooling fluid can be caused to flow and in which is interconnected at least one heat exchanger for extracting heat from the circulating fluid.

28. An electric cable support system as claimed in claim 1, wherein any space between electric cables housed in the duct and said continuous wall is substantially filled with a material of high thermal conductivity.

* * * * *